April 9, 1968
C. E. LENZ
3,377,533
CONTROL SYSTEM FOR POSITIONING A SHAFT IN RESPONSE TO
AN INCREMENTAL DIGITAL INPUT SIGNAL
Filed Sept. 10, 1964
4 Sheets-Sheet 1
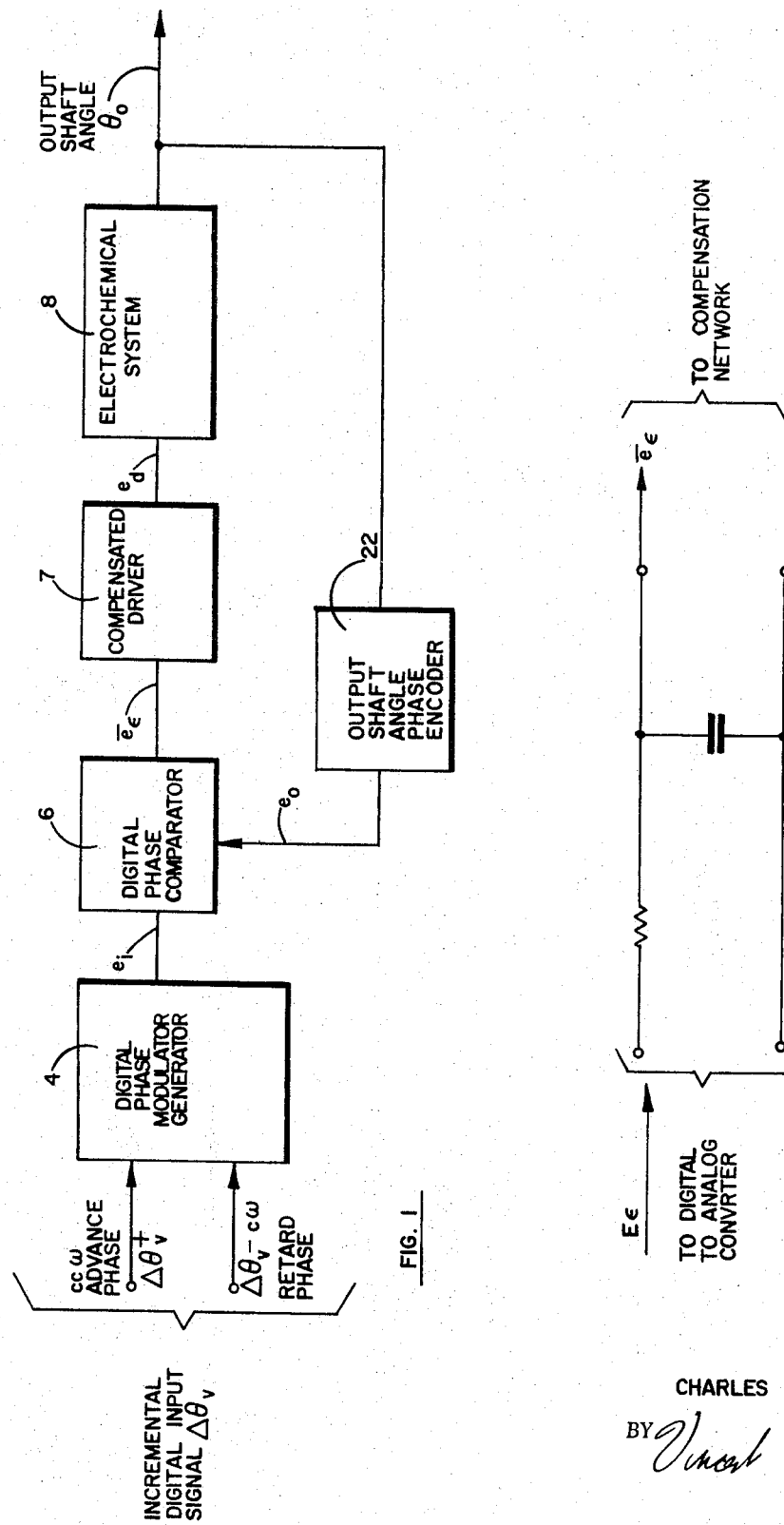
*INVENTOR.*
CHARLES E. LENZ
BY 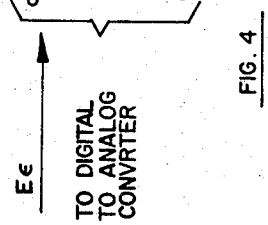
ATTORNEY

INVENTOR.
CHARLES E. LENZ

April 9, 1968

C. E. LENZ 3,377,533

CONTROL SYSTEM FOR POSITIONING A SHAFT IN RESPONSE TO
AN INCREMENTAL DIGITAL INPUT SIGNAL

Filed Sept. 10, 1964

INVENTOR.
CHARLES E. LENZ

BY *Vincent H. Cleary*

ATTORNEY

United States Patent Office 3,377,533
Patented Apr. 9, 1968

3,377,533
CONTROL SYSTEM FOR POSITIONING A SHAFT IN RESPONSE TO AN INCREMENTAL DIGITAL INPUT SIGNAL
Charles E. Lenz, Fullerton, Calif., assignor to North American Rockwell Corporation, a corporation of Delaware
Filed Sept. 10, 1964, Ser. No. 395,530
3 Claims. (Cl. 318—18)

ABSTRACT OF THE DISCLOSURE

A control system for positioning a shaft in response to an incremental digital input signal. A digital phase modulated generator accepts an incremental input signal and in response thereto adds or subtracts pulses from a clock pulse train, thereby providing a square wave having a phase indicative of the input signal. A digital comparator compares the phase of this square wave with the phase of a shaft position indicating signal. The comparator then appropriately increments or decrements a reversible step counter. The digital output of the step counter, indicative of error in shaft position, is converted to analog form, processed by a compensated driver system and applied to a motor which drives the shaft in a direction minimizing shaft position error. The shaft position signal is generated by an Inductosyn receiving as inputs a pair of square waves having a constant 90° phase difference.

---

This invention relates to a digital servo system and more particularly to a high-resolution single mode digital position control system in which the tolerance in positioning a shaft or rack is reduced to the order of an arc second or $10^{-5}$ inches while actually reducing the complexity of the control equipment.

Previous systems having lower performance accuracies normally require two or more modes of control system operation. Several modes of operation require not only duplication of system elements performing similar functions, but also elements for switching between modes. Single mode position control systems which must provide high accuracy over a wide range often use a transducer which has an output which is not a single-valued function of the input. The "Iuductosyn" is an example of such a transducer. In the normal single-mode system, such transducers provide a number of nulls which the output variable may approach if the system output lags the system input by more than a specified amount.

Position-control systems using one or more resolvers or similar transducers on the output shaft often require a separate rotating shaft with attached transducer(s) to generate necessary control signals. Such additional moving elements contribute disadvantages of additional maintenance, additional lags in response, additional errors, additional power consumption, additional mass, and additional volume. Only the output shaft and directly attached elements move in the system described herein.

The input requirements of typical wide-range control systems of high accuracy and resolution are incompatible with the digital signals available directly from the computers with which they must be used. A converter is then required. This converter contributes error, as well as additional power consumption, expense, mass, and volume. No such converter is necessary when the control system discussed here is used with a digital computer or differential analyzer providing a discrete incremental output. Substitution of an input element in the control system to accept whole-number inputs may be desirable in some applications.

The resolution of fully digital shaft-angle encoders yielding only essentially two output levels is limited by constraints dependent on permissible case diameter, attainable mechanical tolerances, and—in an optical encoder—the wavelength of the light source. At the present state of the art, the positional accuracy attainable with a resolver having a large number of poles is greater than that possible with a digital shaft-angle encoder subject to the same constraints. The control system shown combines the accuracy of an analog resolver with the other advantages of a digital control system without elaborate analog-to-digital conversion equipment at the resolver output. This result is accomplished by converting both the resolver output and the digital input command to time delays which are compared directly.

When a digital-to-analog conversion is made to obtain the input voltage for a torquer, amplitude quantization or quantized pulse-width modulation is often used. Different factors tend to limit the number of levels available in each case. With amplitude quantization, the accuracy, stability, and quantity of conversion components necessary to obtain more than 1,000 levels often establishes this number as a practical upper limit. The number of steps which it is practical to obtain by this means in a compact and economical control system is considerably lower. With quantized pulse-width modulation, increasing the number of quanta requires either a faster clock and faster associated logic elements or a longer averaging period. The first approach is expensive and power consuming; the second degrades system response. The digital phase comparator employed here combines amplitude quantization and quantized pulse-width modulation to obtain the advantages of each method without permitting the limitations of either to significantly affect system performance.

In this digital position-control system, both the input command and the output angle are converted to phase displacements or delays. Although a rotational output is discussed, a linear output may be obtained by substitution of an appropriate linear transducer and actuator. A digital step detector drives a reversible step counter and a digital-to-analog converter which furnishes an output voltage of average value proportional to the phase error. This voltage may be modified by rate and/or other compensating signals before being fed into a motor with the proper polarity to reduce the error between the system input and output positions. The digital phase comparator is designed to respond to angles of absolute value greater than $\pi/n$ radians in a noncyclic manner, thereby permitting nonambiguous positioning of the output shaft through use of a transducer with ambiguous output. A multiple-speed control system is thus unnecessary. A pre-set pulse sets initial conditions for all memory elements.

An object of this invention is to provide a positioning servo having no false nulls (so that only one output position can result from a given command) yet without the complexity of multiple-speed analog systems using two or more resolvers or other types of transducers.

Another object of this invention is to provide a positioning servo having a resolution of the order of an arc second or a hundred-thousandths of an inch, the former without a rotor of large circumference which is incompatible with compact low-inertia equipment.

Still another object of this invention is the provision of a positioning servo not requiring complex and detailed adjustment of conventional digital-to-analog converters to produce a drive signal having many levels.

Yet another object of this invention is to provide a positioning system requiring no digital-to-analog converter, necessary in many systems, to position in accordance with the direct output of a digital computer.

And yet another object of this invention is the provision of a shaft positioning system having no moving parts other than the shaft and elements moveable therewith.

These and other objects of this invention will become apparent from the following description taken in connection with the accompanying drawings in which:

FIG. 1 is a block diagram of the digital position control system.

FIG. 4 is a schematic diagram of the averaging element;

Figure 2:
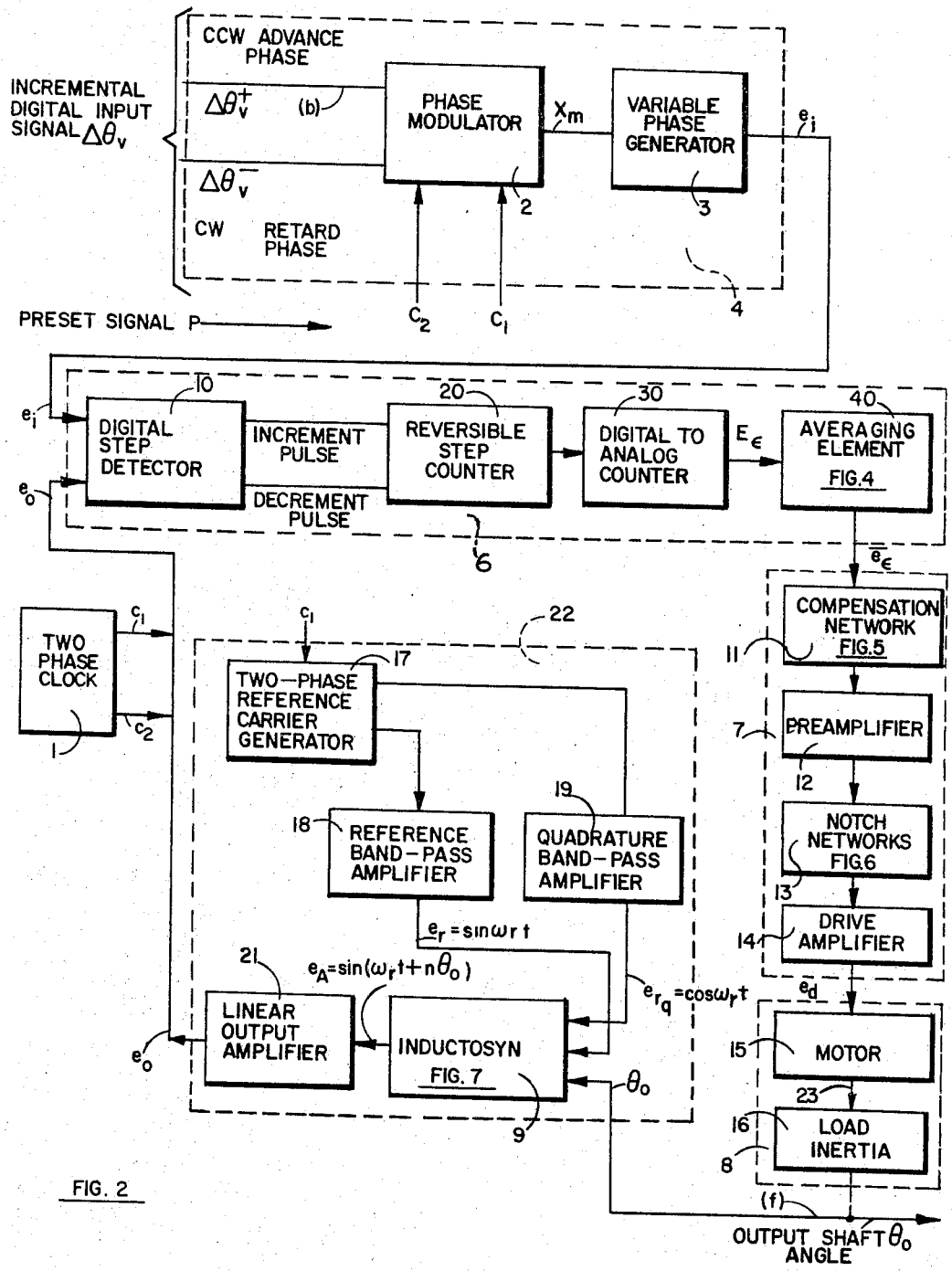
FIG. 2 is a block diagram illustrating a further break down of the digital position-control system.

*Input signal derivation for the high-resolution digital position-control system*

In the following section an analytical expression for the incremental input signals $$\Delta\theta_v^+ \text{ and } \Delta\theta_v^-$$

will be developed. Let the input command $\theta_v(t)$ be an analytic function at every point on the time or $t$ axis such that $$-\frac{\pi}{m_1 n} \leq \theta_v(0) < \frac{\pi}{m_1 n} \quad (1)$$

where $m_1$ is an even positive integer equal to the number of states of the variable-phase carrier generator 3 (see FIG. 2), and $n$ is a positive integer equal to the electrical speed of the output encoder 22. (Hildebrand, F. B., Advanced Calculus, Prentice-Hall, Inc., New York, 1949, pp. 496–499.) Here it is assumed that $\theta_v(t)$ is single-valued and has finite derivatives of all orders for real values of $(t)$. The function $y(\theta_v)$ will be defined as follows:

$$y(\theta_v) \equiv \frac{1}{2}\left(\frac{m_1 n \theta_v}{\pi} + 1\right) \quad (2)$$

The corresponding jump function is (Gardner, Murray F., and Barnes, John L., Transients in Linear Systems. John Wiley & Sons, Inc., New York, 1952, pp. 287–288).

$$\int y(\theta_v) = \int \frac{1}{2}\left(\frac{m_1 n \theta_v}{\pi} + 1\right) \equiv z \quad (3)$$

In accordance with the reference cited a jump function assumes the largest integral value less than or equal to its argument, which in this case is $\frac{1}{2}(m_1 n \pi^{-1}\theta_v + 1)$. The reference states that for "a jump function the value at a discontinuity will be taken as the value of the function as the argument approaches the point of discontinuity from the right." Care is necessary when a jump function is evaluated at a discontinuity, however, if the argument is a dependent variable, as is the case in Relation 3 if $\theta_v$ is a function of the independent variable $t$. If $\int y = z$ is now re-expressed as a function of $t$, it follows that if a discontinuity of $z(t)$ occurs at $t = t_a$, then $$z(t_a) = z(t_a + \delta), \; \theta_v(t_a) > 0$$

and $$z(t_a) = z(t_a - \delta), \; \theta_v(t_a) < 0$$

where $\delta$ is a vanishingly small positive increment of time.

The jump function $z(t)$ will next be resolved into two jump functions, $z^+(t)$ and $z^-(t)$, which increases and decreases monotonically with time, respectively, in such a manner that $$z^+(t) + z^-(t) = z(t) \quad (4)$$

The initial-condition and backward-difference relations $$z^+(0) = z^-(0) = 0 \quad (5)$$

$$\underset{b}{\Delta z^+}(t) = \lim_{\delta \to 0}[z^+(t) - z^+(t-\delta)]$$

$$\equiv \begin{cases} \underset{b}{\Delta z}(t), & \underset{b}{\Delta z}(t) \geq 0 & (6a) \\ 0, & \underset{b}{\Delta z}(t) < 0 & (6b) \end{cases}$$

and $$\underset{b}{\Delta z^-}(t) = \lim_{\delta \to 0}[z^-(t) - z^-(t-\delta)]$$

$$\equiv \begin{cases} \underset{b}{\Delta z}(t), & \underset{b}{\Delta z}(t) \leq 0 & (7a) \\ 0, & \underset{b}{\Delta z}(t) > 0 & (7b) \end{cases}$$

apply to $z^+(t)$ and $z^-(t)$, where the backward difference is defined as $$\underset{b}{\Delta z}(t) \equiv \lim_{\delta \to 0}[z(t) - z(t-\delta)] \quad (8)$$

Thus $$z^+(t) = \sum_{\xi=0}^{t} \underset{b}{\Delta z^+}(\xi) \quad (9)$$

and $$z^-(t) = \sum_{\xi=0}^{t} \underset{b}{\Delta z^-}(\xi) \quad (10)$$

The jump functions $z^+(t)$ and $z^-(t)$ are uniquely defined by either of two combinations of the preceding relations. Relations 5 through 8 form the other. Relations 1 through 3 tions 6 through 10 form the other. Relations 1 through 3 are pertinent in either case.

A constraint must be placed upon the minimum time between consecutive jumps of $z(t)$ of the same polarity. Let the time at which the $k^{\text{th}}$ jump of $z(t)$ for $t > 0$ occurs be designated $t_k$. If, and only if, the jump of $z(t)$ at $t_k + 1$ is of the same polarity as that at $t_k$ $$\left[\underset{b}{\Delta z}(t_k)\right]\left[\underset{b}{\Delta z}(t_{k+1})\right] = 1 \quad (11)$$

Whenever Relation 11 applies, for accurate operation of the control system it is necessary to satisfy a relation of the form $$t_{k+1} - t_k < \tau_i + \tau_d \quad (12)$$

where $\tau_i$ is the standard length of input pulses applied to the position-control system and $\tau_d$ is a delay dependent upon the design of the digital phase modulated generator 4.

The input increment and decrement signals applied to the position-control system are designated $$\Delta\theta_v^+(t) \text{ and } \Delta\theta_v^-(t)$$

respectively. Their difference, $$\Delta\theta_v^+(t) - \Delta\theta_v^-(t)$$

represents scaled difference function for the input signal $\theta_v(t)$. Both $$\Delta\theta_v^+(t) \text{ and } \Delta\theta_v^-(t)$$

are normally false two-level logical signals consisting of pulses of duration $\tau_i > 0$. These two input signals may be described analytically by the relations $$\Delta\theta_v^+(t) = z^+(t) - z^+(t-\tau_i) \quad (13)$$

and $$\Delta\theta_v^-(t) = z^-(t-\tau_i) - z^-(t) \quad (14)$$

Each pulse of $$\Delta\theta_v^+(t) \text{ or } \Delta\theta_v^-(t)$$

respectively, is a command to increase or decrease the output shaft angle $2\pi m_1^{-1} n^{-1}$ radians. The value of $\theta_v(t)$, quantized with a width of $2\pi m_1^{-1} n^{-1}$, is given by $$\tilde{\theta}(t) = \frac{2\pi}{m_1 n}\int\frac{1}{2}\left[\frac{m_1 n \theta_v(t)}{\pi} + 1\right] =$$

$$\frac{2\pi}{m_1 n \tau_i}\int\left[\int^t \Delta\theta_v^+(\xi) - \Delta\theta_v^-(\xi)\right]d\xi$$

$$(15a)$$

where the tilde indicates a quantized variable and algebraic subtraction is indicated, for any value of $t>0$ for which the logical relation $$\Delta\tilde{\theta}_v^+(t) + \Delta\tilde{\theta}_v^-(t) = 0 \qquad (15b)$$

applies.

In all of the figures and discussion which follows, reference is made to an angular positioning system employing an angular transducer. However, it is to be understood that identical concepts can equally well be applied to a linear positioning system using a linear transducer.

Referring to FIG. 1 the system consists of a digital phase-modulated generator 4 which converts the net number of input pulses resulting from variation of $\Delta\theta_v$, each representing forward or reverse, clockwise or counter-clockwise, motion of typically one arc second or $10^{-5}$ inches, to an electrical phase angle $\phi_v$ of signal $e_i$. The phase angle of a discrete-valued square wave such as $e_i$ will be defined here as the phase angle of the fundamental sinusoidal component of the square wave. An output shaft-angle phase encoder 22 converts shaft angle or linear displacement to an electrical phase angle $\phi_o$ of voltage $e_o$; and a digital phase comparator 6 converts the difference between the electrical phase angles of 4 and 22 to a proportional voltage $\bar{e}_\epsilon$ of wide range to reduce the phase difference representing position error to near zero.

Two other elements appear in FIG. 1: A compensated driver 7 which insures loop stability and raises the error signal to the required power level, and the electromechanical system 8, the output of which is a mechanical angle $\theta_o$ which forms the input to the shaft-angle phase encoder 22.

Referring to FIG. 2, the phase-modulated generator consists of a phase modulator 2 having as inputs two incremental digital signal inputs, viz, phase-advance input $$\Delta\theta_v^+$$

and phase-retard input $$\Delta\theta_v^-$$

The advance and retard pulses are also designated CCW and CW, respectively, which correspond to the direction of rotation of the shaft 23. In addition, the phase-modulated generator 4 has as inputs clock trains $C_1$ and $C_2$ from the two-phase clock generator 1. In the steady-state condition with no CW or CCW pulses applied, the output $X_m$ of the phase modulator 2 is the clock train $C_1$ illustrated in FIG. 3(a). For each CCW pulse applied at input $$\Delta\theta_v^+$$

illustrated in FIG. 3(b), the phase modulator 2 will emit one pulse from clock train $C_2$ at $X_m$, in addition to the pulses from clock train $C_1$ normally emitted there. Since the pulses of train $C_1$ and $C_2$ do not overlap, an additional pulse is thus sent to the variable-phase generator 3. For each CW pulse applied at input $$\Delta\theta_v^-$$

the phase modulator will remove one $C_1$ clock pulse which would normally be emitted at $X_m$. The input pulses applied at $$\Delta\theta_v^+ \text{ and } \Delta\theta_v^-$$

can arrive at arbitrary times; after the arrival of such a pulse, a pulse will be added to or removed from the train at $X_m$ as soon as possible consistent with logical operations necessary within the phase modulator 2.

The variable-phase generator 3 is a cyclic counter having $j$ stages and $m_1 = 2^j$ states such that the state of the highest-order stage will change each time $m_1/2$ pulses are applied to it at $X_m$. Other types of variable-phase generators capable of supplying multiple-phase outputs at $e_i$ may be used. The output $e_i$ from the variable-phase generator 3 in the steady state is a balanced square wave illustrated in FIG. 3(c) by pulses 6 to 14.

A phase modulator and variable-phase generator suitable for use in this invention for components 2 and 3 are shown, described and claimed in applicant's co-pending application Serial No. 368,090 filed May 18, 1964, entitled "Digital Phase-Modulated Generator," now Patent No. 3,316,503.

The digital phase comparator 6 consists of a digital step detector 10 having as an input the signal $e_i$. The purpose of the step detector 10 is to emit an increment pulse to the reversible step counter 20 in response to each positive excursion of input $e_i$ and to emit a decrement pulse to counter 20 in response to each negative-slope zero crossing of input $e_o$, illustrated in FIG. 3(d). The digital step-detector 10 also has as inputs the clock trains $C_1$ and $C_2$. In each of the above cases the pulses emitted from detector 10 will be from clock train $C_1$. Output pulses will be emitted as soon as possible consistent with logic provisions necessary to assure that no truncated clock pulses will be sent to the reversible step counter 20. In cases where the instantaneous phase displacement would cause increment and decrement pulses to be emitted simultaneously, both pulses are inhibited.

The purpose of the reversible step counter 20 is to keep a continuous tally of the total number of positive $e_i$ steps which have occurred minus the total number of negative-slope $e_o$ crossings which have occurred. Each count corresponds to $2\pi$ radians of phase displacement.

The initial condition of the step counter 20 is established by a preset pulse $p$ applied to all counter flip-flops. Each flip-flop is designed so that this pulse disables all other inputs which the flip-flop may receive during its duration. In this manner proper initial conditions are established. The removal of this present signal must be synchronized to avoid truncation of any clock pulse.

The purpose of the digital-to-analog converter 30 is to produce an instantaneous output voltage $E_\epsilon$, illustrated in FIG. 3(f), proportional to the contents of the reversible step counter 20, but biased positively by a voltage one-half that corresponding to a single count. The most significant bit represents the algebraic sign, 0 representing positive and 1 representing negative. Negative numbers are represented in two's-complement form.

The purpose of the averaging element 40 is to smooth the output $E_\epsilon$ of the digital-to-analog converted 30 by averaging over a period of time to provide an output signal $\bar{e}_\epsilon$. One circuit suitable in many cases is a resistance-capacitance network (schematically shown in FIG. 4) having the transfer function $$G_a(s) = \frac{1}{\tau s + 1} \qquad (16)$$

where $\tau$ is a time constant of dimension seconds.

Figure 3:
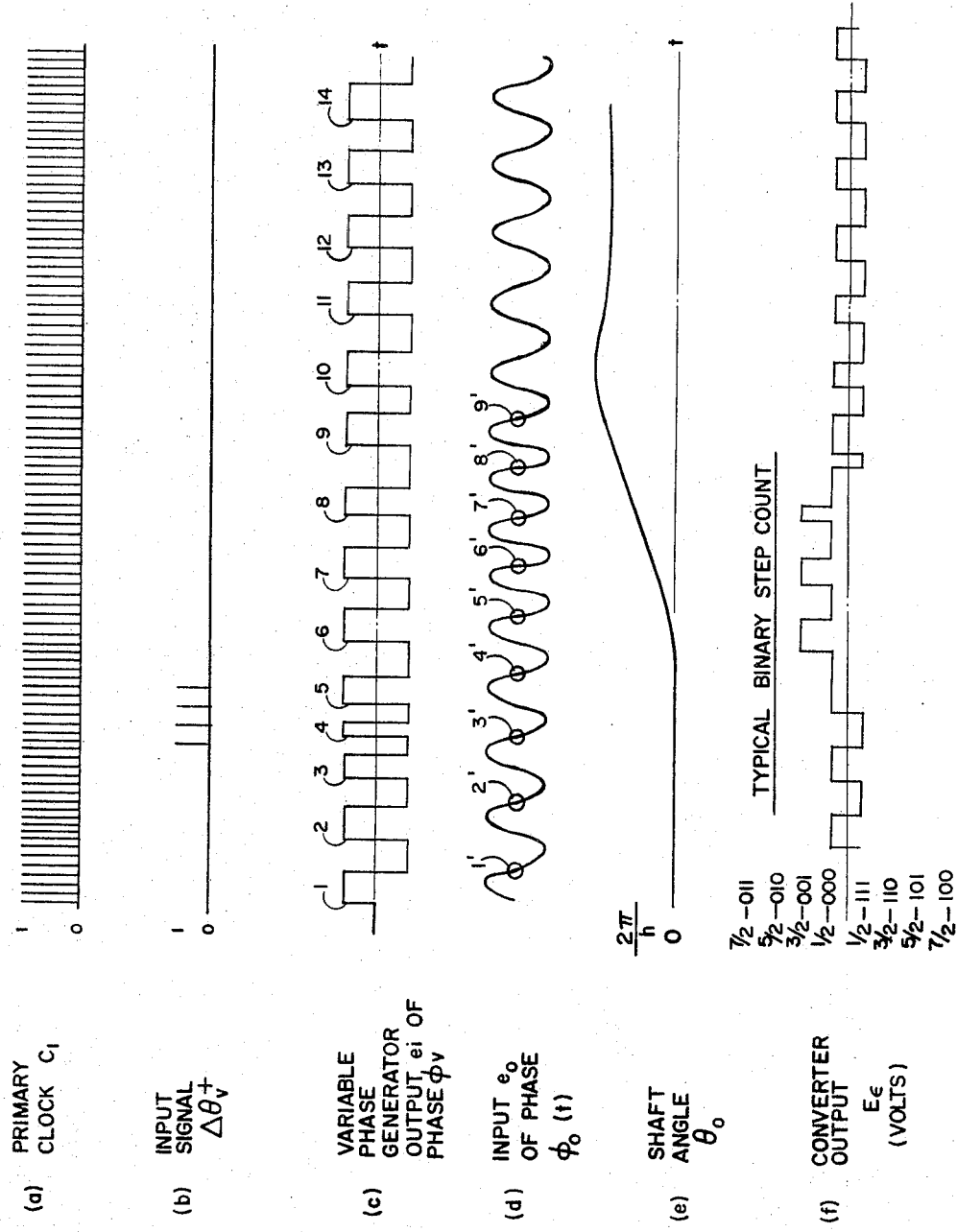
FIG. 3 illustrates the various waveforms present throughout the system.

Typical operation of the digital phase comparator 6 is illustrated by the voltage and phase relations in FIG. 3. The primary clock train $C_1$ appears in FIG. 3(a). The input signals $e_i$ and $e_o$ shown in FIGS. 3(c) and 3(d), respectively. Each positive step of $e_i$ is converted to an increment pulse by the digital step detector 10, which then causes the reversible step counter 20 to count up one. Each negative-slope zero crossing of $e_o$ is similarly converted to a decrement pulse by the digital step detector 10, which then causes the reversible step counter 20 to count down one in the manner previously described. Operation of the step counter 20 and the corresponding output voltage $E_\epsilon$ from the digital-to-analog converter 30 are shown in FIG. 3(f). The phase angles of $e_i$ and $e_o$, designated $\phi_v$ and $\phi_o$, respectively, are plotted in FIGS. 3(c) and 3(d). The initial average value of $E_\epsilon$ is shown to be 0. However, an increase of $2\pi$ radians in $\phi_v$ while $\phi_o$ remains fixed causes a corresponding increase in the average value of $E_\epsilon$. Subsequently, the phase angle $\phi_o$ is also shown to increase from 0 to $2\pi$ radians; at this time, the average value of $E_\epsilon$ returns to zero, corresponding to the zero difference in phase between $e_i$ and $e_o$. The waveforms shown are typical of a servomechanism utilizing the digital phase comparator 6 as an error detector. In this case, $e_i$ corresponds to the input command generated by the digital phase-modulated generator 4 and $e_o$ would correspond to the voltage furnished by the shaft-angle phase-encoder 22 attached to the output shaft 23.

A digital phase comparator suitable for use in this invention for components 10, 20, 30 and 40 is shown, described and claimed in applicant's co-pending application Serial No. 379,997 filed July 2, 1964, entitled "Digital Phase Comparator," now Patent No. 3,329,895.

Figure 5:
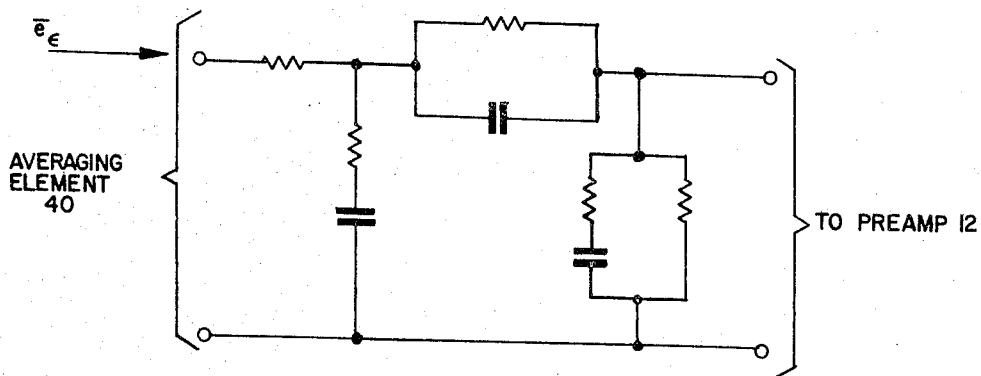
FIG. 5 is a schematic diagram of the compensation network.
Figure 6:
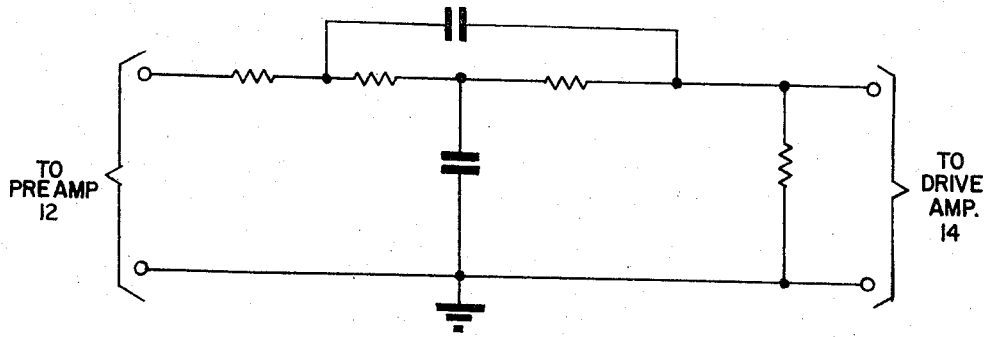
FIG. 6 is a schematic diagram of the notch network.

The compensated driver 7 consists of a compensation network 11 (schematically shown in FIG. 5) having as an input the signal $\bar{e}_\epsilon$. The purpose of the compensation network 11 is to provide the necessary compensation to assure stable operation of the closed servo loop. In addition, it attenuates the carrier-frequency component of the motor signal $e_d$. A pre-amplifier 12 is used to amplify the output from the compensation network 11 and to apply the amplified signal to the notch network 13 (schematically shown in FIG. 6). The notch network 13 is used to attenuate the carrier frequency of the signal $\bar{e}_\epsilon$ and to thereby avoid carrier saturation of the following elements when the magnitude of the average signal voltage is low. It is to be understood that although a bridged-T resistance-capacitance network is shown in FIG. 6, any similar notch frequency-attenuation type device may be substituted in its place.

The output from the notch network 13 is fed to the drive amplifier 14 which amplifies the input signal and applies it as a driving voltage $e_d$ to the electromechanical system 8.

The electromechanical system 8 consists of a D-C motor 15 which responds to the input voltage signal $e_d$ by applying a torque to shaft 23. A motor that may be used satisfactorily in this application is an "Inland" Model T-1321-B permanent-magnet-field unit providing 20 inch-ounces of torque at 24.8 volts and 2.25 amperes. The shaft 23 is connected to a load inertia 16 which may be a telescope that is to be positioned, a gear for positioning a rack and the reflected inertia of the rack and attachments, or any device that is commonly positioned by servomechanisms.

The output shaft-angle phase encoder 22 consists of a two-phase reference-carrier generator 17 which supplies two square waves equal in frequency but separated in phase by 90°. One square wave is applied to the reference bandpass-amplifier 18 which allows the sinusoidal component of the square wave to be passed and amplified and appear at the output as a signal $e_r = \sin \omega_r t$. The other square wave is applied to the quadrature bandpass-amplifier 19 and it is operated upon in a similar manner to supply the signal $e_{r_q} = \cos \omega_r t$.

A device suitable for use as generator 17 in this invention is shown, described and claimed in applicant's co-pending application Serial No. 394,977 filed September 8, 1964, entitled "Digital Reference Source."

Figure 7:
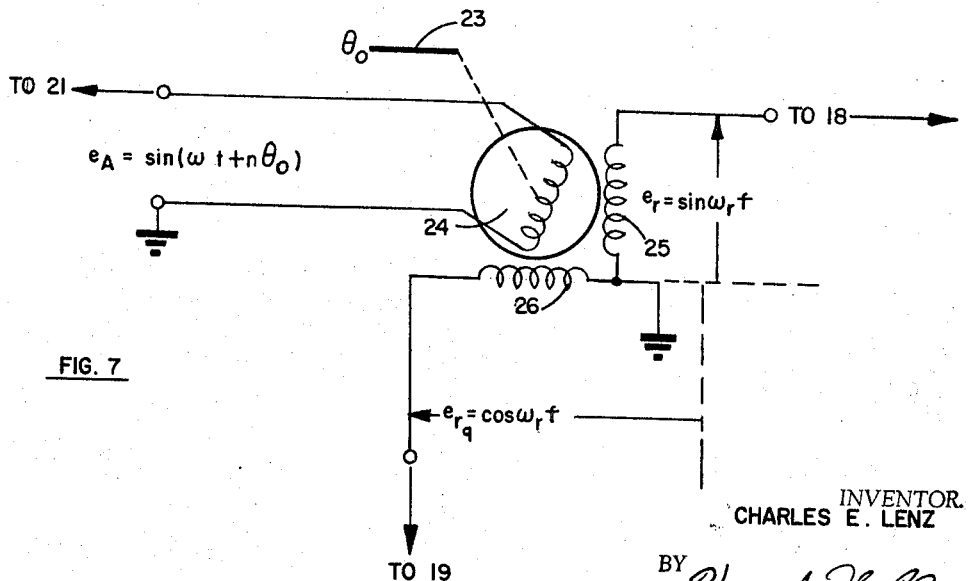
FIG. 7 is a schematic diagram of the Inductosyn.

Blocks 18 and 19 may contain a filter network and amplifiers the function and structure of which is well known to those persons skilled in the art. The "Inductosyn" 9 (schematically shown in FIG. 7) receives the shaft angle $\theta_o$, illustrated in FIG. 3(e), at its rotor 24, the output from amplifier 18 across stator winding 25, and the output from amplifier 19 across stator winding 26. The "Inductosyn" operates upon these inputs and supplies as an output, across the rotor winding 27 a signal $e_A$, which is amplified by the linear output amplifier 21 and appears at its output as the error signal $e_o$, illustrated in FIG. 3(d).

The voltage $e_A$ from the "Inductosyn" 9 varies in phase, but has a constant amplitude. When the shaft phase velocity $\omega_s \theta_o$ is zero, $e_A$ is a sine wave of carrier frequency $\omega_r$ with phrase shift $\eta \theta_o$ directly proportional to the shaft output angle $\theta_o$. The proportionality constant $\eta$ may be an integer of either sign, depending upon the number of output envelopes $\eta$ produced by the "Inductosyn" per shaft revolution.

Operation of the shaft-angle phase encoder 22 is based on the trigonometric equation for the sine of the sum of two angles $x$ and $y$, viz, $$\sin(x+y) = \sin x \cos y + \cos x \sin y \quad (17)$$

If the definitions $$x \equiv \omega_r t \quad (18)$$

and $$y \equiv \theta(t) \quad (19)$$

are made, where $\omega_r =$ a carrier frequency
$t =$ elapsed time, and
$\theta(t) =$ an arbitrary shaft angle Equation 18 becomes $$\sin(\omega_r t + \theta) = \sin \omega_r t \cos \theta + \cos \omega_r t \sin \theta \quad (20)$$

Equation 20 may be applied to a particular "Inductosyn" by setting $$\theta = \eta \theta_o \quad (21)$$

where $\theta_o =$ angular shaft displacement from a selected reference position at which the output $e_o$ of the shaft-angle phase encoder 22 is in phase with carrier $\omega_r$, and
$\eta =$ number of envelope cycles produced per shaft revolution by the particular "Inductosyn" being used when only one input is excited Substitution of Equation 21 into Equation 20 yields $$\sin(\omega_r t + \eta \theta_o) = \sin \omega_r t \cos \eta \theta_o + \cos \omega_r t \sin \eta \theta_o \quad (22)$$

Equation 23 may be mechanized by introducing a reference carrier $$e_r = \sin \omega_r t \quad (23)$$

and the quadrature voltage $$e_{r_q} = \cos \omega_r t \quad (24)$$

into the shaft-cosine and shaft-sine stator inputs, respectively, of an "Inductosyn". The output on the left side of Equation 22 is obtained from the rotor.

In summary, the digitial position-control system is a single-mode phase-comparison servomechanism with the novel ability to correct phase errors as high as many complete cycles, thereby achieving high reliability in the presence of extreme disturbance torques. Both the input command and the output position are encoded as the phase angles of square waves, defined as the phase angles of the fundamental sinusoidal component. The relative delay between the input-command and the output-position sine waves is used to pulse width modulate a discrete-level error signal, which is filtered to yield an average voltage proportional to position error. This error signal is applied to a motor coupled directly to the output shaft to rotate the shaft until the error signal is reduced to approximately zero.

While in order to comply with the statute the invention has been described in language more or less specific as to structural features, it is to be understood that the invention is not limited to the specific features shown, but that the means and construction herein disclosed comprised a preferred form of putting the invention into effect, and the invention is therefore claimed in any of its forms or modifications within the legitimate and valid scope of the appended claims.

What is claimed is:

1. In a digital control system for positioning a shaft in accordance with a net number of input pulses, the combination comprising:
   a two phase clock means for generating a first and second pulse train of equal rate, the phase of said pulse trains being displaced a predetermined fixed amount from each other;

a first means having as inputs two incremental digital signals, one a phase-advance input and the other a phase-retard input, and also connected to receive as inputs the output of said clock means, said means being adapted to emit at its output pulses from said first pulse train in the absence of said input incremental digital signals, and for each of said phase-advance pulses applied to said input to emit one pulse from said second pulse train, and for each phase-retard pulse applied to said input to remove one pulse from said first pulse train;

a variable-phase generator means for counting the output pulses emitted from said first means and having as an output a signal the phase of which is proportional to a predetermined number of said counted pulses;

a phase comparator means for producing an error signal representative of the phase difference between the output of said first means and a second periodically varying signal comprising a second means responsive to a predetermined point in each cycle of said first signal to produce a pulse so as to form a third train of pulses, a third means responsive to a predetermined point in each cycle of said second signal to produce a pulse so as to form a fourth train of pulses, a counter having an up-count and a down-count input, a fourth means for applying said first train of pulses to said up-count input and a fifth means for applying said second train to said down-count input;

a compensated driver means for receiving said error signal and supplying an amplified and compensated signal proportional to said error signal; said compensated driver means comprises notch network means for attenuating the carrier frequency of said error signal and amplifier means for amplifying said error signal;

an electromechanical means for converting said compensated signal into a mechanical displacement of said shaft;

an encoder means for detecting said displacement and supplying said second periodically varying signal having a phase indicative of said displacement such that said displacement is controlled by said net number of input pulses; said encoder means comprising means for producing first and second square wave, said first square wave having a constant phase relationship with said second square wave;

resolver means having first and second windings accepting respectively said first and second square waves, said resolver means further having a third winding rotationally positioned with respect to said first and second windings by said shaft, said third winding supplying said second periodically varying signal.

2. A digital control system, comprising in combination:

a two-phase clock means for generating a first and second pulse train, said second pulse train displaced in phase a fixed predetermined amount from said first pulse train;

a first means responsively connected to said clock means having a first input terminal for receiving phase-advancing pulses and a second input terminal for receiving phase-retard pulses, said first means responsive to emit at its output, in the absence of an input pulse, said first pulse train, and for each phase-advance pulse applied to said first terminal to add one pulse from said second pulse train to said first pulse train, and for each phase-retard pulse applied to said second terminal to remove one pulse from said first pulse-train;

a second means responsively connected to said first means having a two-stage signal, said second means responsive to count said pulses in said first pulse train and to switch said output state each time a predetermined number of said pulses have been counted, such that the output of said second means is a square wave having a phase which varies as a function of the number of pulses present on said first and said second input terminals;

a phase comparator for producing a second output signal which varies as a function of the phase difference between said square wave and a second periodically varying signal comprising a third means for producing a pulse at a predetermined point in each cycle of said square wave so as to form a third train of pulses, and a forth means for producing a pulse at a predetermined point in each cycle of said second signal so as to form a fourth train of pulses, a counter having an up-count input and a down-count input, fifth means for applying said third train of pulses to said up-count input to thereby effect a count on said counter in one direction, sixth means for applying said fourth train of pulses to said down-count input to thereby effect a count in said counter in an opposite direction and seventh means for continuously converting the count of said counter to a corresponding analog signal;

amplifying means for receiving said analog signal and amplifying said signal;

electromechanical means for converting said amplified signal into a mechanical displacement;

encoder means for detecting said displacement and supplying said second periodically varying signal having a phase indicative of said displacement such that said displacement is controlled by the input pulses on said input terminals.

3. A digital control system as defined in claim 2 wherein said encoder means comprises:

means for producing first and second square waves, said first square wave having a constant phase relationship with said second square wave;

resolver means having first and second windings receiving respectively said first and second square waves, said resolver means further having a third winding positioned by said shaft with respect to said first and second windings, said third winding supplying said second periodically varying signal.

References Cited

UNITED STATES PATENTS 3,011,110 11/1961 Yu-Chi Ho et al. _____ 318—28
3,258,667 6/1966 McDonough et al. __ __ 318—18
3,320,501 5/1967 Davies _____ 318—18

BENJAMIN DOBECK, *Primary Examiner.*